United States Patent
Cichon

(10) Patent No.: US 10,634,104 B2
(45) Date of Patent: Apr. 28, 2020

(54) ELECTROMAGNETICALLY ACTUATABLE INTAKE VALVE FOR A HIGH-PRESSURE PUMP, AND HIGH-PRESSURE PUMP

(71) Applicant: Robert Bosch GmbH, Stuttgart (DE)

(72) Inventor: Gabriel Cichon, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/775,059

(22) PCT Filed: Sep. 22, 2016

(86) PCT No.: PCT/EP2016/072597
§ 371 (c)(1),
(2) Date: May 10, 2018

(87) PCT Pub. No.: WO2017/080707
PCT Pub. Date: May 18, 2017

(65) Prior Publication Data
US 2018/0347528 A1     Dec. 6, 2018

(30) Foreign Application Priority Data
Nov. 10, 2015 (DE) .......... 10 2015 222 091

(51) Int. Cl.
*F02M 59/36* (2006.01)
*F02M 59/46* (2006.01)
(Continued)

(52) U.S. Cl.
CPC ........ *F02M 59/466* (2013.01); *F02M 59/366* (2013.01); *F02M 59/367* (2013.01);
(Continued)

(58) Field of Classification Search
CPC .. F02M 59/366; F02M 59/367; F02M 59/466; F02M 63/0071; F02M 2200/03; F02M 2200/8084
See application file for complete search history.

(56) References Cited

U.S. PATENT DOCUMENTS

2009/0114292 A1* 5/2009 Shafer .................. F02M 59/466
137/512
2014/0367498 A1* 12/2014 Takaoku .............. F02M 51/061
239/584
(Continued)

FOREIGN PATENT DOCUMENTS

| DE | 102011086249 A1 | 5/2013 |
|---|---|---|
| DE | 102014200339 A1 | 7/2015 |
| DE | 102014201101 A1 | 7/2015 |

OTHER PUBLICATIONS

International Search Report and Written Opinion with English translation for Application No. PCT/EP2016/072597 dated Nov. 30, 2016 (15 pages).

*Primary Examiner* — Erick R Solis
(74) *Attorney, Agent, or Firm* — Michael Best & Friedrich LLP

(57) ABSTRACT

The invention relates to an electromagnetically actuatable intake valve for a high-pressure pump of a fuel injection system, in particular a common rail injection system, comprising a magnet coil (1) for acting on an armature (2) which is received and guided such that it can be moved with a reciprocating movement in a central recess (3) of a valve body (4), wherein a pole core (6) which is connected via a sleeve (7) to the valve body (4) lies opposite the armature (2) at a working air gap (5). According to the invention, the valve body (4) has a circumferential cut-out (9) within an inner circumferential surface (8) which delimits the recess (3), which cut-out (9) divides the inner circumferential
(Continued)

surface (8) into an upper and a lower guide region (10, 11). The invention also relates to a high-pressure pump for a fuel injection system, in particular a common rail injection system, comprising said type of intake valve.

19 Claims, 4 Drawing Sheets

(51) Int. Cl.
*F02M 59/48* (2006.01)
*F02M 63/00* (2006.01)
*F16K 31/06* (2006.01)

(52) U.S. Cl.
CPC ........ *F02M 59/48* (2013.01); *F02M 63/0071* (2013.01); *F16K 31/0675* (2013.01); *F02M 2200/03* (2013.01); *F02M 2200/8084* (2013.01)

(56) References Cited

U.S. PATENT DOCUMENTS

2018/0283573 A1* 10/2018 Maiwald ................. H01F 7/081
2019/0017480 A1* 1/2019 Schulz ............... F02M 63/0071

* cited by examiner

ELECTROMAGNETICALLY ACTUATABLE INTAKE VALVE FOR A HIGH-PRESSURE PUMP, AND HIGH-PRESSURE PUMP

BACKGROUND OF THE INVENTION

The invention relates to an electromagnetically actuable suction valve for a high pressure pump of a fuel injection system, in particular of a common rail injection system, comprising a magnet coil for acting on an armature which is received and guided such that it can be moved with a reciprocating movement in a central recess of a valve body, a pole core which is connected via a sleeve to the valve body lying opposite the armature at a working air gap. Furthermore, the invention relates to a high pressure pump for a fuel injection system, in particular a common rail injection system, having a suction valve of this type.

DE 10 2014 200 339 A1 has disclosed an electromagnetically actuable suction valve for a high pressure pump of a fuel injection system, in particular of a common rail injection system, which suction valve comprises an annular magnet coil for acting on an armature, which can be moved with a reciprocating movement, and a pole core which delimits a working air gap together with the armature. The pole core therefore serves as a stroke stop for the armature. When the armature comes into contact with the pole core, high stop forces act on the pole core. Said forces are transmitted via components which are connected to the pole core to a housing of a high pressure pump, into which housing the suction valve is inserted and is fixed by means of a valve screw. This is because the pole core is connected to the valve screw via a sleeve which is welded to the two components in a fluid-tight manner. Since the stop forces can assume high values, there is the risk that the welded connections fail prematurely and lead to leaks and/or the functional loss of the suction valve. In order to counteract this, it is proposed in DE 10 2014 200 339 A1 to prestress the pole core axially in the direction of the armature. In this way, the welded seam, via which the pole core is connected to the sleeve, is to be relieved and the robustness of the suction valve is to be improved.

Proceeding from the abovementioned prior art, the present invention is based on the object of specifying an electromagnetically actuable suction valve, the robustness of which is increased further.

In order to achieve the object, the electromagnetically actuable suction valve according to the invention is proposed. Furthermore, a high pressure pump having a suction valve of this type is proposed.

SUMMARY OF THE INVENTION

The electromagnetically actuable suction valve which is proposed for a high pressure pump of a fuel injection system, in particular of a common rail injection system, comprises a magnet coil for acting on an armature which is received and guided such that it can be moved with a reciprocating movement in a central recess of a valve body. Here, a pole core which is connected via a sleeve to the valve body lies opposite the armature at a working air gap. According to the invention, the valve body has a circumferential cutout within an inner circumferential face which delimits the recess, which cutout divides the inner circumferential face into an upper and a lower guide region.

Improved guidance of the armature is achieved by way of the division of the inner circumferential face into an upper and a lower guide region. This counteracts, in particular, oblique positioning of the armature. Even in the case of a slight oblique position of the armature, said armature is guided at its two ends via two bearing points which lie diametrically opposite one another. A first upper bearing point is situated in the upper guide region and the second bearing point is situated in the lower guide region, with the result that a maximum bearing point spacing is achieved. Furthermore, the wear in the contact region between the armature and the valve body is reduced by way of the improved guidance and the associated reduced oblique positioning of the armature. Moreover, the wear in the region of the stop faces of the armature or its contact partners is reduced. The reduced wear has a positive effect on the robustness of the suction valve.

Moreover, undesired fluctuations of the armature stroke can be minimized via the improved guidance and the associated reduced oblique positioning of the armature. This in turn has a positive effect on the functional reliability of the suction valve.

The sleeve which connects the pole core and the valve body is preferably welded both to the pole core and to the valve body. The welded connection is preferably achieved by way of in each case one circumferential welded seam, with the result that the sealing action is brought about at the same time. In order to prevent warping of the valve body during laying of the welded seam, it is proposed that the sleeve is welded to the valve body at the level of the circumferential cutout. Since the valve body is not in contact with the armature in the region of the cutout, influencing of the armature guidance by way of the welded seam or by way of a welded seam burr can be prevented or at least reduced.

Furthermore, the circumferential cutout in the valve body is preferably configured as an annular groove, the cross-sectional dimension of which is greater in the axial direction than in the radial direction. The dimension in the radial direction should be dimensioned in such a way that a welded seam burr of a welded seam which is laid in the region of the cutout does not protrude into the guide diameter of the central recess of the valve body. Analogously, the dimension of the cutout in the axial direction is preferably selected in such a way that it is greater than a welded seam influencing width, in order to prevent any influence of the welded seam on the guidance of the armature.

The cutout which is configured as an annular groove at the same time forms a type of lubricant reservoir which is filled with fuel at all times during the operation of the suction valve. The fuel which is present in the cutout assists the lubrication of the armature in the region of its mounting. To this extent, a comparatively great dimension in the axial direction has a favorable effect in relation to the sought wear reduction in the bearing region.

The circumferential cutout in the inner circumferential face of the valve body preferably has a rectangular cross section. A cut out of this type can be produced simply and therefore inexpensively.

It is proposed in one development of the invention that the circumferential cutout merges via rounded or beveled edges into the inner circumferential face of the valve body. The rounded or beveled edges ensure that the edges do not come into contact with the outer circumferential face of the armature. Furthermore, they facilitate the entry and exit of fuel into the cutout, in order to assist the lubrication in the bearing region of the armature in this way.

The circumferential cutout is advantageously arranged centrally in relation to an armature movement space which is delimited by an upper and a lower stroke stop. As a result, even in the case of a slight oblique position of the armature, it is ensured that the upper bearing point and the lower bearing point come to lie at all times above and below the cutout, respectively. Accordingly, the armature cannot become jammed in the cutout.

The upper stroke stop is preferably formed by way of the pole core, and the lower stroke stop is preferably formed by way of an annular shoulder of the valve body or an annular stop element which is supported thereon. The axial spacing between the pole core and the shoulder or the stop element which is supported thereon therefore defines the armature movement space. The wear can be reduced further via the stop element, since the latter can be manufactured from a particularly wear-resistant material and/or can be hardened.

Furthermore, the armature is preferably penetrated by at least one equalizing bore. The equalizing bore makes a pressure equalization during the movement of the armature possible, by fuel being displaced via the equalizing bore from one side to the other side of the armature. The armature preferably has a plurality of equalizing bores of this type which are arranged in a circular manner and at an identical angular spacing from one another, in order to achieve an armature movement which is as uniform as possible.

In order to further reduce the wear in the region of the stop faces and contact faces of the armature, it is proposed that the armature comprises a contact pin for making contact with a valve tappet of the suction valve. This is because the contact pin can be manufactured from a particularly wear-resistant material and/or can be hardened. The material of the armature can then be selected predominantly with regard to its magnetic properties, since the requirements with regard to its wear resistance are then only low.

The high pressure pump for a fuel injection system, in particular a common rail injection system, which high pressure pump is proposed, furthermore, in order to achieve the abovementioned object, is distinguished by the fact that it comprises a suction valve according to the invention and a cylinder head, into which the suction valve is preferably integrated. A high pressure pump of compact design can be provided in this way.

BRIEF DESCRIPTION OF THE DRAWINGS

One preferred embodiment of the invention will be described in greater detail in the following text using the appended drawings, in which.

DETAILED DESCRIPTION

Figure 1:
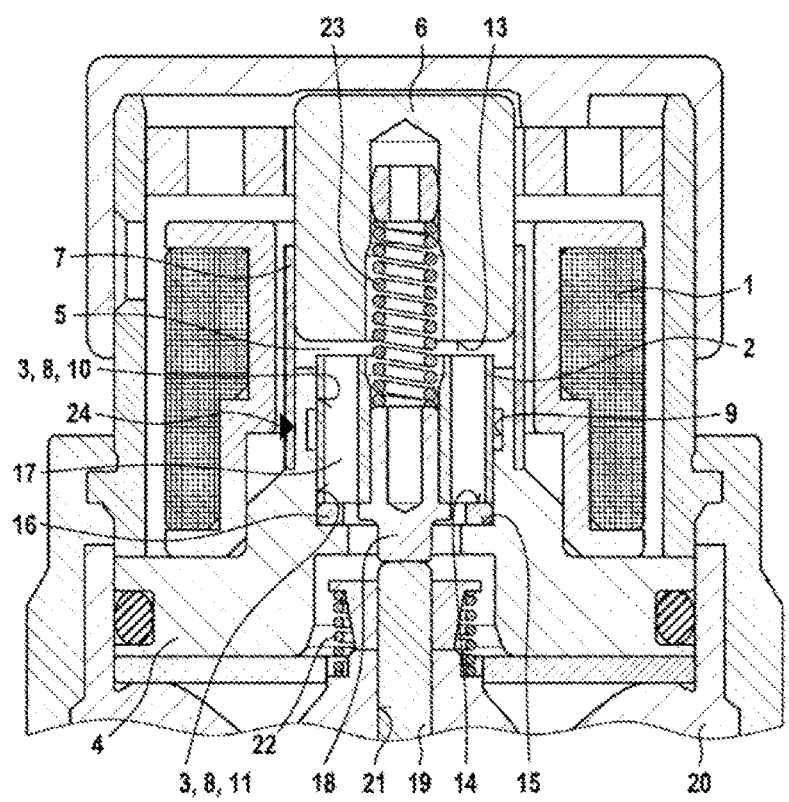
FIG. 1 shows a diagrammatic longitudinal section through an electromagnetically actuable suction valve according to the invention which is integrated into a high pressure pump.

The electromagnetically actuable suction valve which is shown in FIG. 1 comprises a valve tappet 19 which is guided with a reciprocating movement in a bore 21 of a cylinder head 20 of a high pressure pump. That is to say, the suction valve is integrated into the cylinder head 20 of the high pressure pump. The valve tappet 19 is prestressed axially in the closing direction via a valve spring 22. Moreover, a further spring 23 acts on the valve tappet 19, which further spring 23 is supported on one side on a pole core 6 and on the other side on a contact pin 18 which is connected fixedly to an armature 2 and serves to mechanically couple the armature 2 to the valve tappet 19. The spring force of the further spring 23 is greater than that of the valve spring 22, with the result that the further spring 23 holds the suction valve open as long as a magnet coil 1 for acting on the armature 2 remains deenergized. If, in contrast, the magnet coil 1 is energized, a magnetic field is formed, the magnetic force of which moves the armature 2 counter to the spring force of the spring 23 in the direction of the pole core 6, in order to close a working air gap 5 between the pole core 6 and the armature 2. Here, the contact pin 18 is released from the valve tappet 19, and the valve spring 22 is capable of closing the suction valve. If the energization of the magnet coil 1 is ended, the armature 2 and the contact pin 18 are returned into their starting position via the spring force of the spring 23. Here, the contact pin 18 comes into contact with the valve tappet 19 and lifts the latter out of its seat, with the result that the suction valve opens again.

The two end positions of the armature 2 are defined by way of an upper stroke stop 13 and a lower stroke stop 14. The upper stroke stop 13 is formed by way of the pole core 6. An annular stop element 16 serves as a lower stroke stop 14, which annular stop element 16 is supported on an annular shoulder 15 of a valve body 4. The annular shoulder 15 delimits a central recess 3 of the valve body 4, in which central recess 3 the armature 2 is received and guided such that it can perform a reciprocating movement. The guidance of the armature 2 takes place via an inner circumferential face 8 of the valve body 4, which inner circumferential face 8 has a circumferential cutout 9 which divides the inner circumferential face 8 into an upper guide region 10 and a lower guide region 11.

A sleeve 7 is connected to the valve body 4 via a welded seam 24 in the region of the cutout 9. The welded seam 24 is arranged at the level of the cutout 9, with the result that it has no influence on the upper or lower guide region 10, 11 for guiding the armature 2. Accordingly, the stroke of the armature 2 is not impaired by way of the welded seam 24. In order to make short switching times possible, the armature 2 additionally has a plurality of decentrally arranged equalizing bores 17 which penetrate the armature 2. In the case of a stroke of the armature 2, fuel is capable of flowing from the top to the bottom or vice versa via the equalizing bores 17, in order to bring about the required pressure equalization.

Figure 2:
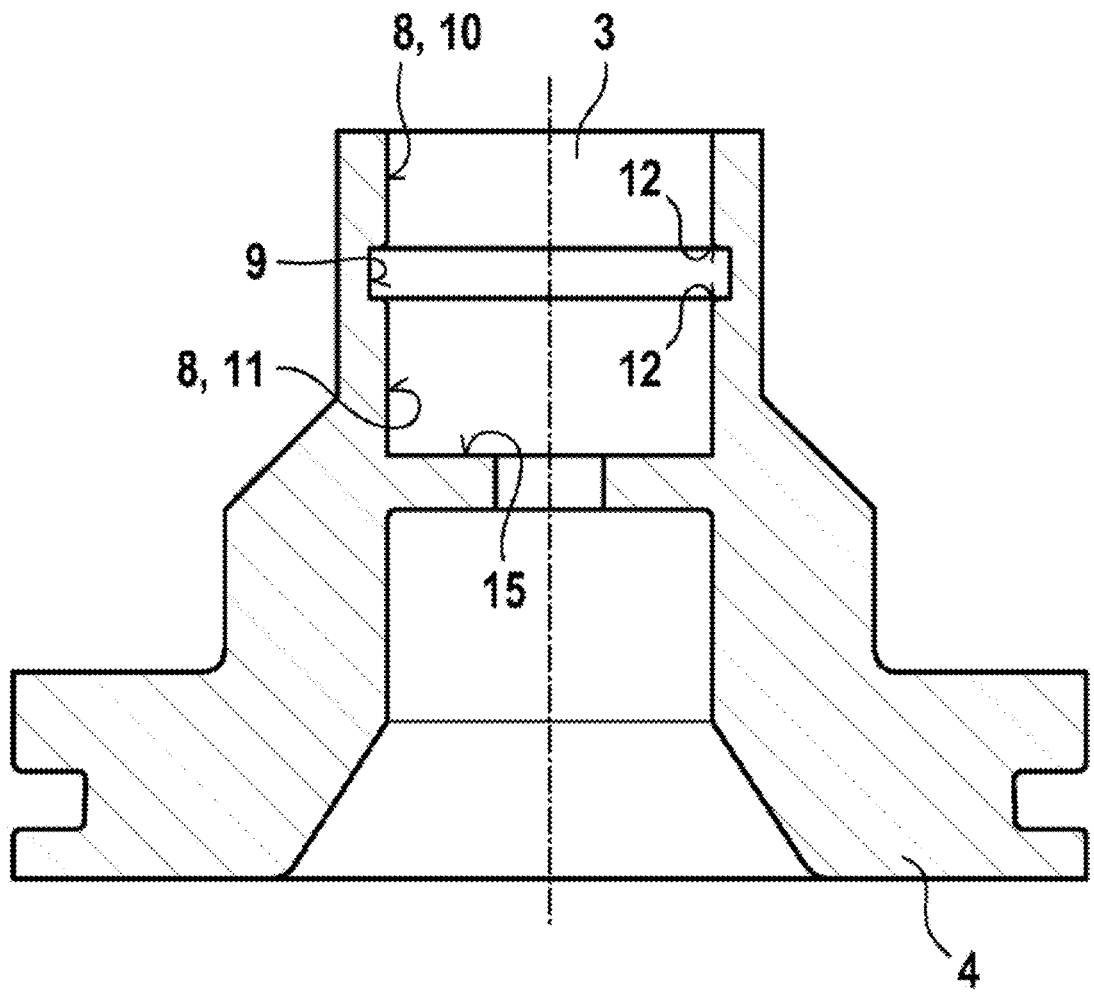
FIG. 2 shows a diagrammatic longitudinal section through the valve body of the suction valve from FIG. 1.

FIG. 2 shows the valve body 4 of the suction valve from FIG. 1 on an enlarged scale. The central recess 3 for receiving and guiding the armature 2 is delimited in the radial direction by the inner circumferential face 8 and in the axial direction by the annular shoulder 15. In the present case, the illustration of the stop element 16 and the armature 2 has been dispensed with for the sake of clarity. The inner circumferential face 8 is divided by the circumferential cutout 9 into the upper and the lower guide region 10, 11. The position of the cutout 9 in the axial direction is selected to be central in relation to the armature movement space which is predefined by way of the upper and the lower stroke stop 13, 14 (see FIG. 1). This ensures that the cutout 9 is arranged at a sufficient spacing from an upper and a lower bearing point 25, 26 of the armature 2.

Figure 3:
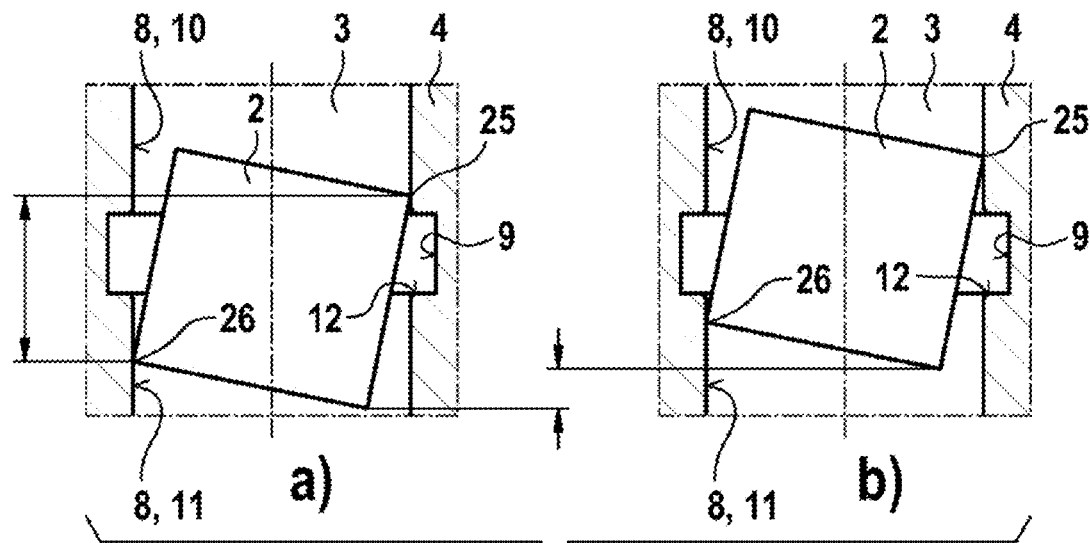
FIG. 3 shows a diagrammatic longitudinal section through the valve body with an armature which is inserted therein, a) in a lower position, b) in an upper position.

As shown in FIGS. 3a) and b), the bearing points 25, 26 shift with the stroke of the armature 2. The upper bearing point 25 is situated at all times above the cutout 9, however, and the lower bearing point 26 is situated at all times below the cutout 9. This ensures that the armature 2 does not become jammed within the cutout 9, in particular in the oblique position. Furthermore, the cutout 9 has rounded edges 12, with the result that it is ensured that the guide diameter of the central recess 3 of the guide body 4 is not restricted.

Figure 4:
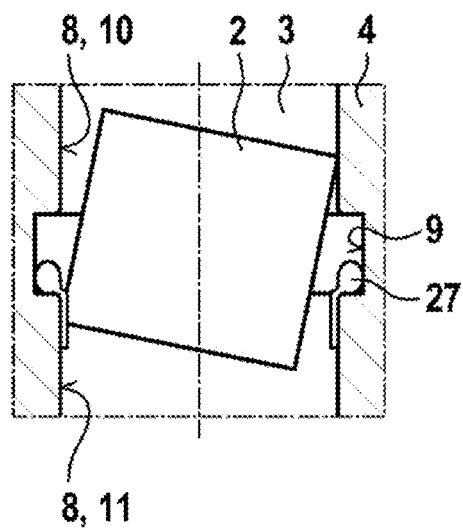
FIG. 4 shows a diagrammatic longitudinal section through the valve body with an armature which is inserted therein in order to illustrate the function of the cutout as a lubricant reservoir.

In addition, the rounded edges 12 promote the uptake of fuel 27, with the result that the cutout 9 serves at the same time as a lubricant reservoir. This is shown diagrammatically in FIG. 4.

Figure 5:
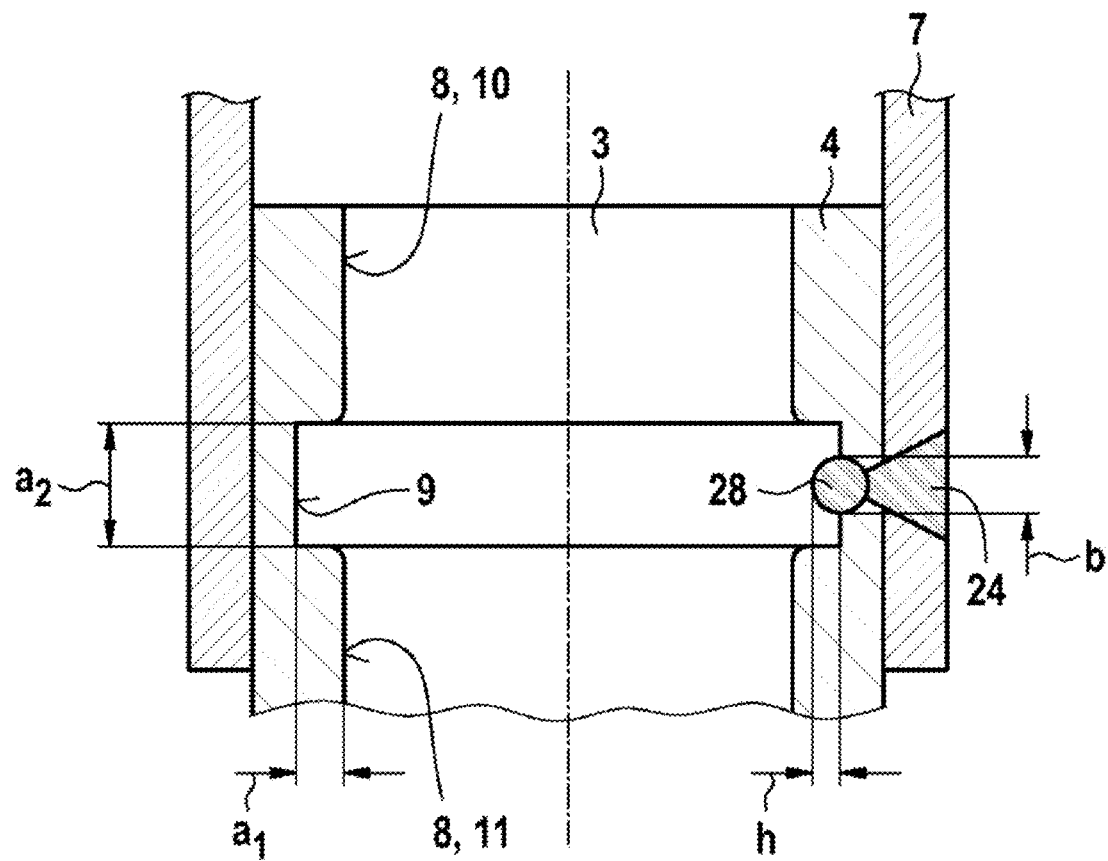
FIG. 5 shows a diagrammatic longitudinal section through the valve body with a sleeve.

As shown in FIG. 5, the dimension of the circumferential cutout 9 can be selected in such a way that the welded seam 24 has no influence on the guidance of the armature 2. To this end, in the radial direction, the dimension $a_1$ is selected to be greater than the height h of a welded seam burr 28. Furthermore, the dimension $a_2$ in the axial direction is selected to be greater than the maximum influencing width b of the welded seam 24.

The invention claimed is:

1. An electromagnetically actuable suction valve for a high pressure pump of a fuel injection system, comprising a magnet coil (1) for acting on an armature (2) which is received and guided such that the armature can be moved with a reciprocating movement in a central recess (3) of a valve body (4), and a pole core (6) which is connected via a sleeve (7) to the valve body (4) lying opposite the armature (2) at a working air gap (5), characterized in that the valve body (4) has a circumferential cutout (9) within an inner circumferential face (8) which delimits the recess (3), wherein the cutout (9) divides the inner circumferential face (8) into an upper guide region and a lower guide region (10, 11), wherein the sleeve (7) is welded to the valve body (4) in a region of the circumferential cutout (9).

2. The suction valve as claimed in claim 1, characterized in that the sleeve (7) is welded to the valve body (4) at a level of the circumferential cutout (9) such that a resulting weld seam between the sleeve (7) and the valve body (4) has no influence on the upper guide region (10) or the lower guide region (11) of the circumferential face (8).

3. The suction valve as claimed in claim 1, characterized in that the circumferential cutout (9) is configured as an annular groove, a cross-sectional dimension of which is greater in an axial direction than in a radial direction.

4. The suction valve as claimed in claim 1, characterized in that the circumferential cutout (9) has a rectangular cross section.

5. The suction valve as claimed in claim 1, characterized in that the circumferential cutout (9) merges via rounded or beveled edges (12) into the inner circumferential face (8).

6. The suction valve as claimed in claim 1, characterized in that the circumferential cutout (9) is arranged centrally in relation to an armature movement space which is delimited by an upper stroke stop and a lower stroke stop (13, 14) for the armature (2).

7. The suction valve as claimed in claim 6, characterized in that the upper stroke stop (13) is formed by the pole core (6), and the lower stroke stop (14) is formed by an annular shoulder (15) of the valve body (4) or an annular stop element (16) which is supported on the valve body.

8. The suction valve as claimed in claim 1, characterized in that the armature (2) is penetrated by at least one equalizing bore (17).

9. The suction valve as claimed in claim 1, characterized in that the armature (2) comprises a contact pin (18) for making contact with a valve tappet (19) of the suction valve.

10. A high pressure pump for a fuel injection system, having a suction valve as claimed in claim 1 and a cylinder head (20).

11. The high pressure pump as claimed in claim 10, wherein the suction valve is integrated into the cylinder head.

12. The high pressure pump as claimed in claim 10, characterized in that the sleeve (7) is welded to the valve body (4) at a level of the circumferential cutout (9).

13. The high pressure pump as claimed in claim 10, characterized in that the circumferential cutout (9) is configured as an annular groove, a cross-sectional dimension of which is greater in an axial direction than in a radial direction.

14. The high pressure pump as claimed in claim 10, characterized in that the circumferential cutout (9) has a rectangular cross section.

15. The high pressure pump as claimed in claim 10, characterized in that the circumferential cutout (9) merges via rounded or beveled edges (12) into the inner circumferential face (8).

16. The high pressure pump as claimed in claim 10, characterized in that the circumferential cutout (9) is arranged centrally in relation to an armature movement space which is delimited by an upper stroke stop and a lower stroke stop (13, 14) for the armature (2).

17. The high pressure pump as claimed in claim 16, characterized in that the upper stroke stop (13) is formed by the pole core (6), and the lower stroke stop (14) is formed by an annular shoulder (15) of the valve body (4) or an annular stop element (16) which is supported on the valve body.

18. The high pressure pump as claimed in claim 10, characterized in that the armature (2) is penetrated by at least one equalizing bore (17).

19. The high pressure pump as claimed in claim 10, characterized in that the armature (2) comprises a contact pin (18) for making contact with a valve tappet (19) of the suction valve.

* * * * *